Figures 4, 5:
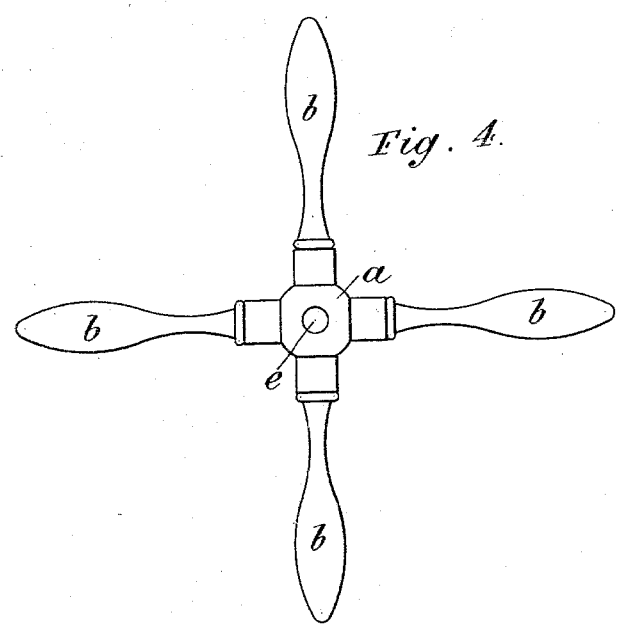

(No Model.) 2 Sheets—Sheet 1.
C. E. CAMPBELL.
APPARATUS FOR INDICATING TELEPATHIC MESSAGES.
No. 546,299. Patented Sept. 17, 1895.
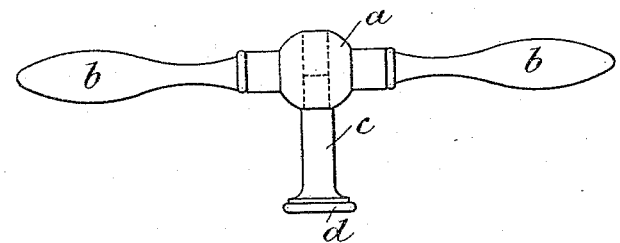
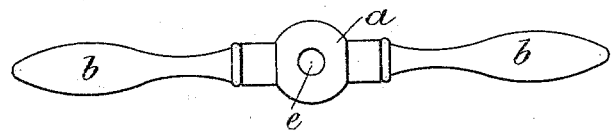
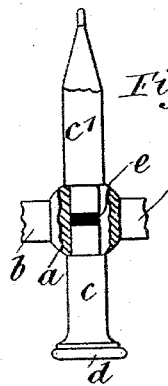
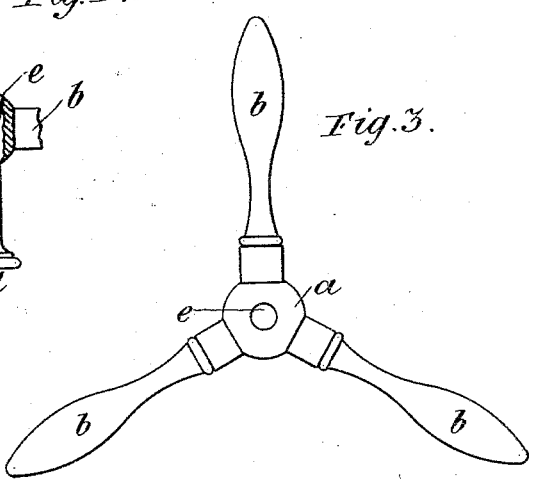
Witnesses
Inventor
Colin Edwin Campbell
by
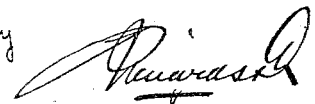
Attorneys (No Model.) 2 Sheets—Sheet 2.

C. E. CAMPBELL.
APPARATUS FOR INDICATING TELEPATHIC MESSAGES.

No. 546,299. Patented Sept. 17, 1895.

UNITED STATES PATENT OFFICE.

COLIN EDMUND CAMPBELL, OF LONDON, ENGLAND.

APPARATUS FOR INDICATING TELEPATHIC MESSAGES.

SPECIFICATION forming part of Letters Patent No. 546,299, dated September 17, 1895.

Application filed January 23, 1895. Serial No. 535,898. (No model.)

*To all whom it may concern:*

Be it known that I, COLIN EDMUND CAMPBELL, classical coach, a subject of Her Majesty the Queen of Great Britain and Ireland, residing at 34 Lower Belgrave Street, London, in the county of Middlesex, England, have invented certain Apparatus or Means for the Indication of Telepathic or Like Messages, of which the following is a specification.

This invention relates to apparatus or means for the indication of those messages or communications known to the interested in psychical research as "telepathic," "automatic," and "spiritistic" messages, the said messages being indicated by the apparatus, which is operated by the hand, either by means of a lettered chart or by visible writing.

According to my invention I employ a holder or boss, from which extend radially two or more handles. The said holder or boss, which may, if desired, be made integral with the handles, has a hole formed therein for the reception of a leg, which terminates in a smooth foot and projects from the boss at right angles to the said handles. In conjunction with the above I employ an indicating-surface or chart having the letters of the alphabet, the numerals, and, if desired, certain words and signs marked thereon, so as to be flush with the surface thereof. The before-mentioned leg is to be placed upon this chart and operated by hand, as will be more fully described hereinafter. If preferred, a pencil may be employed to serve as the leg, and in this case a plain surface, such as a sheet of paper or a card, would be substituted for the above-mentioned chart.

I will now fully describe my invention and the manner of performing the same, having reference to the accompanying drawings, in which—

Figure 1 is a side elevation, and Fig. 2 is a plan, of apparatus constructed in accordance with my invention and provided with two manipulating-handles. Figs. 3 and 4 represent in plan similar apparatus constructed, respectively, with three and four manipulating-handles. Fig. 5 is a plan of the indicating-surface or chart. Fig. 1$^a$ represents the apparatus provided with a smooth-footed leg and also with a pencil-leg projecting from opposite sides thereof.

$a$ is the holder or boss, and $b$ represents the manipulating-handles extending radially therefrom.

$c$ is a leg, which terminates in a smooth foot $d$ and is adapted to fit into the hole $e$ in the boss $a$.

The handles $b$ are to be held in the hands of the operator or operators, and the foot $d$ is to be placed upon the chart, Fig. 5, when the message will be indicated or spelled out by the movement of the foot from one letter to another, caused by telepathic, automatic, or spiritistic communication to the operator or operators. If preferred, a pencil $c'$ may be employed to serve as the leg and inserted in the hole $e$, either in substitution for the leg $c$ or as an additional leg arranged to project from the opposite side of the boss $a$, as shown in Fig. 1$^a$. When the pencil-leg is used, a plain sheet of paper or a card may be utilized for the indicating-surface, the message being communicated as above set forth and being indicated thereon in visible writing.

When the apparatus is being operated by one person only, the manipulation of the same will be facilitated if one or more of the handles $b$ are rested upon the chart or indicating-surface. Suitable clips or clamps may be furnished with the apparatus for securing the chart or indicating-surface to a table.

In conclusion, I would observe that I am aware that the well-known apparatus for a like purpose, known as "planchette," has been used both with a pencil for indicating in visible writing and also with a smooth-footed leg for indicating by means of a lettered chart, and I wish it to be clearly understood that I do not claim as my invention any arrangement of apparatus wherein a table or board supported on feet or rollers and carrying a pointer and moved by hand over an indicating-surface or chart is employed.

In my invention a single point of contact with the board is used, resulting in increased sensitiveness over the above-mentioned form of device, in which a table is provided with a series of feet to bear on the indicating-surface or chart.

What I claim, and desire to secure by Letters Patent of the United States, is—

1. The herein described scientific toy comprising a board and a spider like device movable over the surface thereof, said device having a central boss, handles radiating therefrom, and a central indicating leg extending at right angles to the plane of the handles from the said boss and resting upon the table, substantially as described.

2. The herein described scientific toy, comprising a board, and a spider like device movable over the same, said device consisting of a central boss with a perforation extending entirely through the same, the handles radiating from said boss and the removable indicating leg and pencil extending from the central boss and on opposite sides thereof and at right angles to the plane of the handles, substantially as described.

In testimony whereof I have signed my name to this specification, in the presence of two subscribing witnesses, this 7th day of January, 1895.

COLIN EDMUND CAMPBELL.

Witnesses:
A. E. ALEXANDER,
A. O. MORGAN.